US 6,731,875 B1

United States Patent
Kartalopoulos

(10) Patent No.: US 6,731,875 B1
(45) Date of Patent: May 4, 2004

(54) WAVELENGTH BUS ARCHITECTURE FOR ULTRA-HIGH SPEED DENSE WAVELENGTH DIVISION MULTIPLEXED SYSTEMS

(75) Inventor: Stamatios Vasilios Kartalopoulos, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/237,122

(22) Filed: Jan. 26, 1999

Related U.S. Application Data
(60) Provisional application No. 60/101,301, filed on Sep. 22, 1998.

(51) Int. Cl.$^7$ ................................. H04J 14/02
(52) U.S. Cl. ........................... 398/68; 398/75
(58) Field of Search ............... 359/124; 398/68, 398/75

(56) References Cited

U.S. PATENT DOCUMENTS

| | | | | |
|---|---|---|---|---|
| 4,677,618 A | * | 6/1987 | Haas et al. | 714/700 |
| 5,040,170 A | * | 8/1991 | Upp et al. | 359/135 |
| 5,136,587 A | * | 8/1992 | Obana et al. | 370/112 |
| 5,157,530 A | | 10/1992 | Loeb et al. | 359/124 |
| 5,535,373 A | | 7/1996 | Olnowich | 395/500 |
| 5,742,605 A | * | 4/1998 | Norman, Jr. | 370/405 |
| 5,751,454 A | * | 5/1998 | MacDonald et al. | 359/119 |
| 5,784,184 A | * | 7/1998 | Alexander et al. | 359/125 |
| 5,793,510 A | | 8/1998 | Samejima et al. | 359/158 |
| 5,793,770 A | | 8/1998 | St. John et al. | 370/401 |
| 5,796,502 A | | 8/1998 | Haller, Jr. | 359/124 |
| 6,101,561 A | | 8/2000 | Beers et al. | 710/66 |
| 6,259,555 B1 | | 7/2001 | Meli et al. | 359/337 |

OTHER PUBLICATIONS
L. Bergman et al., "An All-Optical Long-Distance Multi-Gbytes/s Bit-Parallel WDM Single-Fiber Link", Journal of Lightwave Technology, vol. 16, No. 9, Sep. 1998, pp. 1577–1582.

* cited by examiner

Primary Examiner—Leslie Pascal
Assistant Examiner—David C. Payne
(74) Attorney, Agent, or Firm—Gregory J. Murgia

(57) ABSTRACT

High speed transport in a dense wavelength division multiplexed system is achieved by transmitting information supplied by multiple sources in a parallel format using a subset of the total number of optical channels in a wavelength division multiplexed signal as a parallel bus transmission group. In one illustrative embodiment, a selected number of optical channels, i.e., wavelength channels, in the wavelength division multiplexed signal are allocated to form a parallel bus transmission group, i.e., a wavelength bus. Information from one or more sources is supplied in a parallel format and then transmitted at the same transmission rate in each of the optical channels in the wavelength bus. When information from more than one source is to be transported, the information from each source is multiplexed into a parallel format. More specifically, parallel byte interleaving is used so that parallel formatted information supplied by one source is byte interleaved with parallel formatted information from another source and so on. The wavelength bus architecture is highly scalable in that a wavelength division multiplexed signal can be partitioned into multiple wavelength buses with each wavelength bus sized according to the bandwidth requirements of the traffic to be transported. The wavelength bus is sized by either changing the number of wavelength channels, changing the transmission bit rate for the wavelength channels in the wavelength bus, or a combination of both techniques.

19 Claims, 16 Drawing Sheets

FIG. 2 rail 1: $a_{10}\ k_{20}\ m_{30}\ \ldots\ p_{80}\ b_{10}\ \ell_{20}\ n_{30}\ \ldots\ q_{80}\ \ldots$ → via $\lambda_1$ rail 2: $a_{11}\ k_{21}\ m_{31}\ \ldots\ p_{81}\ b_{11}\ \ell_{21}\ n_{31}\ \ldots\ q_{81}\ \ldots$ → via $\lambda_2$ rail 3: $a_{12}\ k_{22}\ m_{32}\ \ldots\ p_{82}\ b_{12}\ \ell_{22}\ n_{32}\ \ldots\ q_{82}\ \ldots$ → via $\lambda_3$ rail 4: $a_{13}\ k_{23}\ m_{33}\ \ldots\ p_{83}\ b_{13}\ \ell_{23}\ n_{33}\ \ldots\ q_{83}\ \ldots$ → via $\lambda_4$ rail 5: $a_{14}\ k_{24}\ m_{34}\ \ldots\ p_{84}\ b_{14}\ \ell_{24}\ n_{34}\ \ldots\ q_{84}\ \ldots$ → via $\lambda_5$ rail 6: $a_{15}\ k_{25}\ m_{35}\ \ldots\ p_{85}\ b_{15}\ \ell_{25}\ n_{35}\ \ldots\ q_{85}\ \ldots$ → via $\lambda_6$ rail 7: $a_{16}\ k_{26}\ m_{36}\ \ldots\ p_{86}\ b_{16}\ \ell_{26}\ n_{36}\ \ldots\ q_{86}\ \ldots$ → via $\lambda_7$ rail 8: $a_{17}\ k_{27}\ m_{37}\ \ldots\ p_{87}\ b_{17}\ \ell_{27}\ n_{37}\ \ldots\ q_{87}\ \ldots$ → via $\lambda_8$

FIG. 13

|       |     |     |     |     |     |
|-------|-----|-----|-----|-----|-----|
| λ1:   | a10 | k10 | m30 | ... | p80 b10 ... |
| λ2:   | a11 | k11 | m31 | ... | p81 b11 ... |
| λ3:   | a12 | k12 | m32 | ... | p82 b12 ... |
| λ4:   | a13 | k13 | m33 | ... | p83 b13 ... |
| λ5:   | a14 | k14 | m34 | ... | p84 b14 ... |
| λ6:   | a15 | k15 | m35 | ... | p85 b15 ... |
| λ7:   | a16 | k16 | m36 | ... | p86 b16 ... |
| λ8:   | a17 | k17 | m37 | ... | p87 b17 ... |
| λm:   |     | p   |     |     | p ...       |

WAVELENGTH BUS ARCHITECTURE FOR ULTRA-HIGH SPEED DENSE WAVELENGTH DIVISION MULTIPLEXED SYSTEMS

CROSS-REFERENCE TO RELATED APPLICATION

This application claims priority of U.S. Provisional Application Ser. No. 60/101,301 filed on Sep. 22, 1998.

FIELD OF THE INVENTION

The invention relates generally to lightwave communication systems and, more particularly, to techniques for transporting information at high speeds in dense wavelength division multiplexing systems.

BACKGROUND OF THE INVENTION

Optical fiber has become the transmission medium of choice for communication networks because of the speed and bandwidth advantages associated with optical transmission. Wavelength division multiplexing (WDM), which combines many optical signals at different wavelengths for transmission in a single optical fiber, is being used to meet the increasing demands for more speed and bandwidth in optical transmission applications. With recent advances in optical networking technology, system manufacturers are now contemplating dense wavelength division multiplexing (DWDM) systems that carry, for example, as many as 40, 80, or more channels in a single fiber and with bit rates up to 10 Gbps per channel. In these DWDM systems, aggregate bandwidth in a single fiber is a function of the number of wavelength channels and the bit rate per wavelength channel.

DWDM is generally regarded as a channelized technology because a separate wavelength channel is allocated for carrying traffic from each source or user. Despite the many advantages of DWDM, the channelized nature of DWDM imposes limitations on transporting information in existing systems and networks. For example, wavelength exhaust becomes a problem because the number of users that can be supported by a DWDM system is limited by the number of available wavelengths. The total bandwidth in a DWDM system may also be used inefficiently if all wavelengths are not being used to transport information at the maximum possible bit rate. Excessive overhead, e.g., hardware and software, is yet another problem associated with the channelized nature of existing LDWDM transport schemes. In particular, because each wavelength channel is typically dedicated to carrying a specific type of traffic, each wavelength channel therefore requires its own hardware and software resources. For example, each wavelength channel may transport information at a different bit rate and therefore require a dedicated clock recovery mechanism and dedicated synchronization and recognition circuitry at the receiving end to process the serially transmitted bit stream. Consequently, cost and complexity will increase as a function of the increase in number of wavelength channels.

Transporting information in existing DWDM systems is also limited by commercially available electronic and photonic components. For example, electronic circuitry, e.g., synchronization circuitry used in receivers, typically cannot process data at the same speeds as the photonic components used for optically transmitting data in the optical fiber. Even if higher speed circuitry was available, this circuitry would add more cost and complexity to the system.

Latency or delays associated with multiple parallel-to-serial and serial-to-parallel conversions of data is another problem with existing DWDM transport schemes. For example, while most communication sources supply parallel formatted information (e.g., voice and video codecs, ASCII data generators, etc.), information is still transmitted serially in each wavelength channel of a DWDM system. As a result, undesirable delays are caused by the multiple parallel-to-serial and serial-to-parallel conversions occurring in the transmission path.

SUMMARY OF THE INVENTION

High speed transport in a dense wavelength division multiplexed system without the latency and bandwidth limitations of prior systems is achieved according to the principles of the invention by transmitting information in a parallel format using a subset of the total number of optical channels in a wavelength division multiplexed signal as a parallel bus transmission group.

Information supplied by multiple sources, which may be operating at different transmission rates, is multiplexed into a parallel format and transmitted at the same transmission rate in each of the optical channels in the parallel bus transmission group.

According to one illustrative embodiment of the invention, a selected number of optical channels in a wavelength division multiplexed signal are allocated to form a parallel bus transmission group. Because each optical channel in the parallel bus transmission group is associated with a particular wavelength, the parallel bus transmission group can also be referred to as a wavelength bus. Information from one or more sources is supplied in a parallel format 30 and then transmitted at the same transmission rate in each of the optical channels in the wavelength bus. When information from more than one source is to be transported, the information from each source is multiplexed into a parallel format. More specifically, parallel byte interleaving is used so that parallel formatted information supplied by one source is byte interleaved with parallel formatted information from another source and so on. The wavelength bus architecture is highly scalable in that a wavelength division multiplexed signal can be partitioned into multiple wavelength buses with each wavelength bus sized according to the bandwidth requirements of the traffic to be transported. In particular, the wavelength bus is sized by changing the number of optical channels, i.e., wavelength channels, by changing the transmission bit rate for the wavelength channels in the wavelength bus, or by a combination of both. Additionally, a single wavelength bus can transport a combination of differently formatted traffic (e.g., SONET, ATM, IP, etc.) as well as traffic supplied at different bit rates.

By transmitting information in parallel using a wavelength bus architecture, delays otherwise associated with parallel-to-serial and serial-to-parallel conversions are substantially reduced as compared with existing systems. Limitations associated with the channelized nature of existing DWDM systems are also overcome according to the principles of the invention. For example, problems relating to wavelength exhaust and inefficient use of bandwidth are overcome because a separate optical channel (i.e., wavelength) is not required for each user or traffic source when using the wavelength bus architecture according to the principles of the invention. Furthermore, because information is transported in parallel using multiple optical channels in a wavelength bus, fewer clock recovery mechanisms and less complex synchronization and recognition circuitry may be used as compared to existing WDM transport schemes. More specifically, existing systems require this type of circuitry on a per-channel basis (e.g., a phase locked loop for each bit stream), whereas the wavelength bus architecture facilitates the sharing of circuitry across an entire group of optical channels.

BRIEF DESCRIPTION OF THE DRAWING

A more complete understanding of the present invention may be obtained from consideration of the following detailed description of the invention in conjunction with the drawing in which:

FIG. 2 is a simplified diagram showing one exemplary data structure for transporting information according to the principles of the invention;

FIGS. 13–16 are simplified diagrams showing various embodiments for synchronizing information transported in a wavelength bus according to the principles of the invention.

DETAILED DESCRIPTION OF THE INVENTION

In a typical DWDM system, a number of different optical channels, i.e., wavelength channels, within an optical fiber are each used to transport a serial bit stream. As such, DWDM is a channelized technology in which a wavelength channel must be dedicated to carrying only traffic supplied by a single source or user. As previously indicated, this type of transport scheme has disadvantages, such as: wavelength exhaustion once all available wavelength channels are assigned; inefficient use of the total bandwidth when not all wavelength channels are being used at the maximum possible bit rate; and limitations on the speed of transport over a given wavelength channel because of limitations in the electronic circuitry used for processing the signals at the receiver, to name a few.

Figure 1:
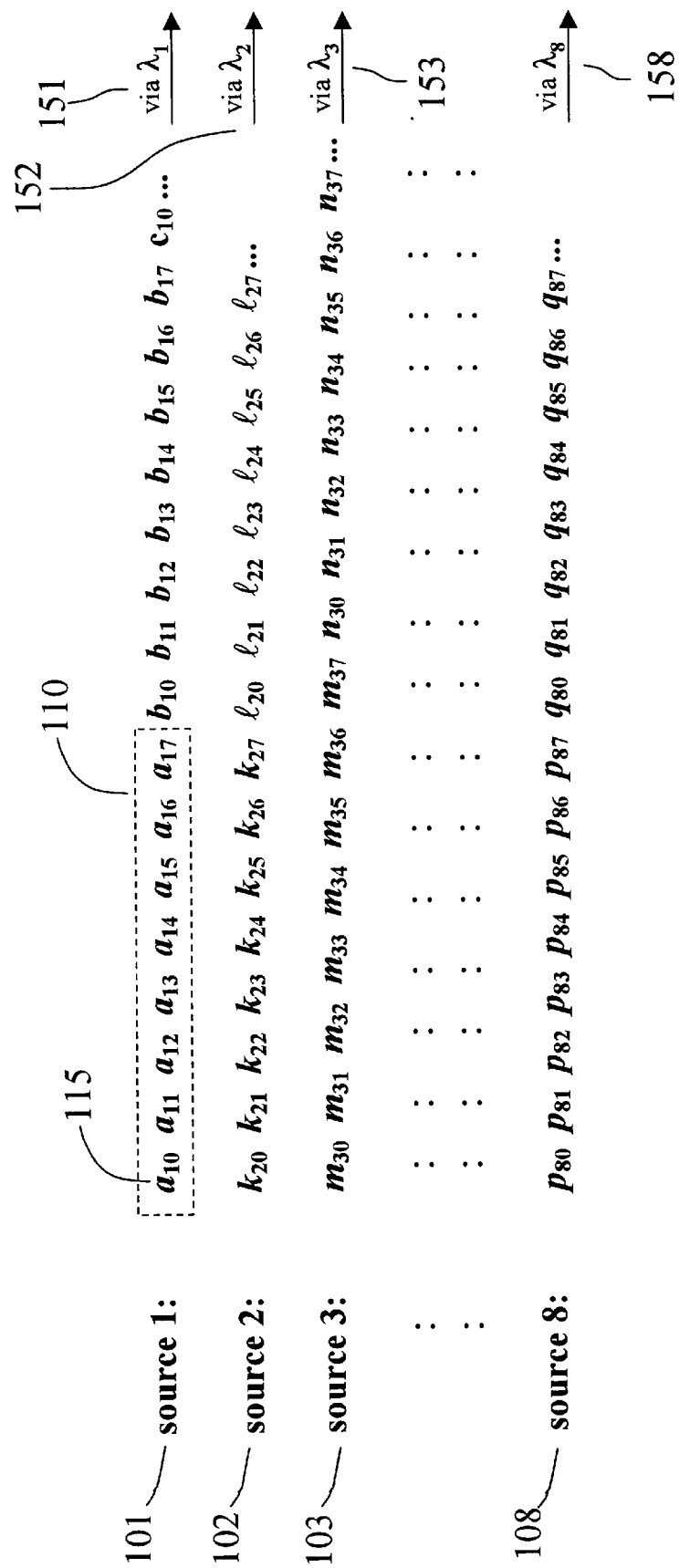
FIG. 1 is a simplified diagram of a data structure for transmitting information in a prior art DWDM transport scheme.

FIG. 1 shows a typical example of how data is transmitted in a prior art DWDM transport scheme. More specifically, FIG. 1 illustrates an example of a typical channel organization for a DWDM system that uses eight (8) wavelength channels 151–158 (e.g., $\lambda_1$ to $\lambda_8$) to transport data supplied by eight (8) sources 101–108, using a typical one-to-one correspondence between the wavelength channels and the sources. In order to simplify the drawing, sources 104–107 and wavelength channels 154–157 have been omitted. Generally, a serial bit stream may include several tributaries wherein the data from each tributary may be organized in bytes or packets. As is well known, a bit stream in each wavelength channel does not necessarily have to be frame or byte synchronized with the others. As shown, the bit stream supplied by source 101 and carried in wavelength channel 151 ($\lambda_1$) includes byte 110 ($a_{ij}$) wherein i represents the source of the byte and j represents the particular bit within the respective byte. For example, bit 115 ($a_{10}$) represents bit 0 of byte a supplied by source 101, $a_{17}$ represents bit 7 of byte a supplied by source 101, and so on. Similarly, byte $b_{ij}$ carried in wavelength channel 151 ($\lambda_1$) as well as the bytes transported in the bit streams of the other wavelength channels 152–158 ($\lambda_2$ through $\lambda_8$) are organized in a similar manner using the same convention. For simplicity of description, a byte size of 8 bits is shown, although the byte size may be any number of bits. Using well-known techniques, the data supplied by sources 101–108 is converted to optical format and then transmitted in the eight (8) separate wavelength channels 151–158 in an optical fiber.

According to the principles of the invention, information is transported in a parallel format in a DWDM system using a parallel bus architecture. In general, a predetermined number of wavelength channels in a multi-wavelength DWDM signal are allocated or partitioned into a parallel bus transmission group, i.e., a "wavelength bus". Information supplied by one or more sources is multiplexed, such as by byte interleaving, into a parallel format and transmitted at the same transmission rate in each of the wavelength channels of the wavelength bus.

FIG. 2 shows an example of how data is transported according to one embodiment of the invention. More specifically, wavelength bus 200 comprises wavelength channels 251–258 ($\lambda_1$ to $\lambda_8$) wherein each of wavelength channels 251–258 is used to transport information from one or more sources (not shown) supplied in a parallel format via rails 201–208. As shown, the information to be transported via wavelength bus 200 is organized in bytes using parallel byte interleaving. By way of example, byte 210, the structure of which is representative of the other bytes as well, comprises 8 bits, one of which is shown as bit 215. It should be noted that the labeling convention for bit 215 and the other bits in FIG. 2 is the same as that previously described for FIG. 1. For example, byte 210 includes bits $a_{10}$ through $a_{17}$, wherein $a_{10}$ represents bit 0 of byte a supplied by source 1, $a_{17}$ represents bit 7 of byte a supplied by source 1, and so on. Because the data is parallel formatted, each of rails 201–208 includes one bit of each byte, such as byte 210. As a result, wavelength bus 200 is effectively an 8-bit wide bus using 8 different wavelength channels 251–258 to transport each byte supplied via rails 201–208.

In the example shown in FIG. 2, 8-bit bytes are byte interleaved so that bytes from a particular traffic source are repeated every eight parallel bytes. More specifically, byte 210 ($a_{10}$–$a_{17}$) from source 1 is supplied via rails 201–208 so that bit $a_{10}$ is transported in wavelength channel 251 ($\lambda_1$), bit $a_{11}$ is transported in wavelength channel 252 ($\lambda_2$), and so on. The next byte from source 1 is byte 211 ($b_{10}$–$b_{17}$) which is byte interleaved according to a predefined byte repetition rate and transported using the same wavelength channels 251–258 ($\lambda_1$,$\lambda_8$) in wavelength bus 200. In this example, a byte repetition rate is selected so that byte 211 from source 1 is transmitted after intervening bytes from other sources are transmitted, e.g., bytes k and l from source 2, bytes m and n from source 3, bytes p and q from source 8, and so on.

Although each wavelength channel 251–258 still contains a serially transmitted bit stream, parallel byte interleaving results in a parallel transmission scheme whereby a byte of information from any given source is transmitted using all wavelength channels 251–258 of wavelength bus 200. Accordingly, parallel transmission in the wavelength bus requires that each wavelength channel 251–258 in wavelength bus 200 transmit at the same transmission bit rate regardless of the bit rate of the signal sources. The advantages of parallel transmission in a wavelength bus will become apparent in the subsequent discussions regarding scalability of the wavelength bus architecture.

A byte size of 8 bits was used as an example in the foregoing embodiment, however, it should be noted that the byte size may be any number of bits. Additionally, FIG. 2 illustrated only one of many parallel byte interleaving schemes that can be used in conjunction with the invention. It should also be noted that although wavelength bus 200 is shown to include 8 wavelength channels 251–258, wavelength bus 200 may comprise any number of wavelength channels as will be described in more detail below. Consequently, the foregoing embodiments are meant to be illustrative only and not limiting in any way.

As previously noted, multiple parallel-to-serial and serial-to-parallel conversions may occur as information is transported using conventional transport schemes through a communication system and these conversions result in a certain amount of latency in the transport of data. By contrast, the parallel transmission characteristics of the wavelength bus are particularly complementary to existing communication schemes because data to be transported in a DWDM system generally originates in a parallel format, e.g., from voice codecs for voice services, video codecs for video services, and from ASCII generators for data services by way of example. Consequently, the number of parallel-to-serial and serial-to-parallel conversions is substantially reduced using the wavelength bus architecture according to the principles of the invention.

Although the foregoing embodiments were described in the context of a single wavelength bus formed from a group of eight (8) wavelength channels within a DWDM signal, a wavelength bus may be created to be any size (i.e., number of wavelength channels or rails) and a single optical fiber carrying a DWDM signal may have more than one wavelength bus therein.

Accordingly, the wavelength bus architecture is highly scalable and, as such, may be used to partition a DWDM signal in many different ways. In general, a wavelength division multiplexed signal can be partitioned into multiple wavelength buses with each wavelength bus sized according to the bandwidth requirements of the traffic to be transported. In particular, the wavelength bus is sized by changing the number of optical channels, i.e., wavelength channels, by changing the transmission bit rate for the wavelength channels in the wavelength bus, or by a combination of both. Additionally, a single wavelength bus can transport a combination of differently formatted traffic (e.g., SONET, ATM, IP, etc.) as well as traffic supplied at different is bit rates. Alternatively, because different types of traffic have different requirements, a group of wavelength buses may be partitioned so that each wavelength bus is sized to transport one type of traffic within that wavelength bus. This scalability allows the DWDM signal to be optimally designed according to heterogeneous traffic requirements.

Figure 3:
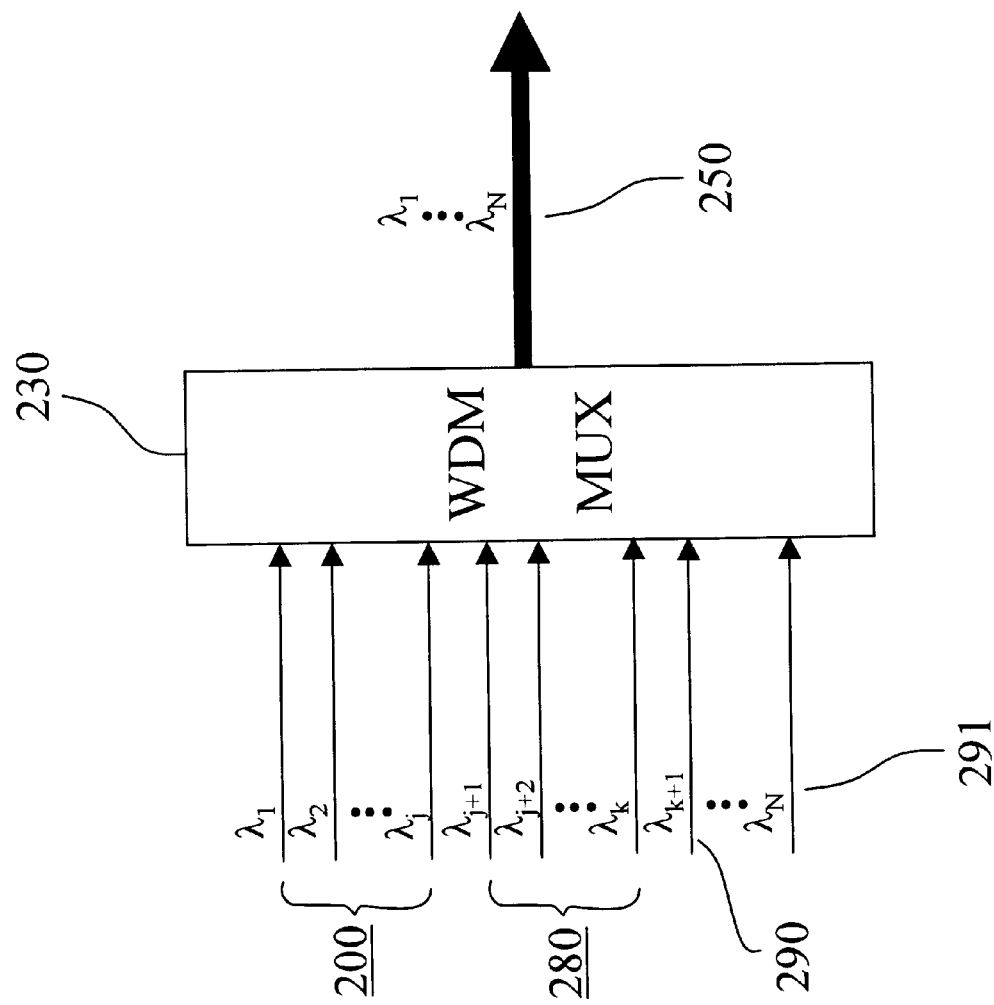
FIG. 3 is a simplified block diagram of one embodiment of a wavelength bus architecture according to the principles of the invention.

FIG. 3 illustrates one aspect of the aforementioned scalability advantages of the 20 wavelength bus architecture according to the principles of the invention. As shown, a wavelength division multiplexer 230 multiplexes many different wavelength channels ($\lambda_1$–$\lambda_N$) for transmission in a single optical fiber 250. In this example, wavelength channels ($\lambda_1$–$\lambda_j$) are allocated to form wavelength bus 280, wavelength channels ($\lambda_{j+1}$–$\lambda_k$) are allocated to form wavelength bus 281, and wavelength channel 290 ($\lambda_{k+1}$) through wavelength channel 291 ($\lambda_N$) can be used for conventional DWDM transport and not grouped into wavelength buses. Accordingly, a DWDM signal transported in optical fiber 250 may have one or more wavelength buses, each of which may have any number of wavelength channels, and the wavelength buses may be used in conjunction with conventional transport schemes within the same DWDM signal. It should be noted that the size and number of wavelength buses may vary so this embodiment is only meant to be illustrative and not limiting.

The above example illustrates the scalability advantages of the wavelength bus architecture in terms of the number of wavelength buses and the number of wavelength channels within any particular wavelength bus. Another important factor in the scalability of the wavelength bus is aggregate bandwidth. As indicated, the wavelength bus architecture is not limited like current DWDM transport schemes because a single wavelength channel does not have to be dedicated to just carrying one type of traffic from a single source or user. More specifically, a wavelength bus can be tailored according to a desired aggregate bandwidth, regardless of the number of wavelength channels in the wavelength bus, by changing the transmission bit rate of the wavelength channels within the wavelength bus.

In general, the aggregate bandwidth of the wavelength bus must be equal to or higher than the aggregate bandwidth of the traffic channels (e.g., bit streams) being transported. For example, 8 traffic channels (e.g., bit streams) each transported at 10 Gbps requires an aggregate bandwidth of 80 Gbps. The aggregate bandwidth of 80 Gbps can be obtained when these 8 traffic channels (bit streams) are transported using a parallel, 8-rail wavelength bus with each rail having a bit rate of 10 Gbps. However, in contrast to existing DWDM transport schemes, the wavelength bus architecture is not constrained by the one to one correspondence between a wavelength channel and a traffic channel (e.g., bit stream supplied to the DWDM system). That is, a wavelength bus may transport more traffic channels than wavelength channels. For example, 10 traffic channels (bit streams) each at 10 Gbps requires an aggregate bandwidth of 100 Gbps. With the wavelength bus architecture, 10 wavelength channels are not necessarily needed for transporting this traffic requirement. Instead, an 8-rail wavelength bus can transport these 10 traffic channels by transporting the information on each rail at 12.5 Gbps (100 Gbps/8 rails) thus providing the required 100 Gbps of aggregate bandwidth. This methodology can also be extended to serial channels with different bit rates. Consequently, a wavelength bus architecture is extremely flexible in that it may be engineered to initially transport a certain bandwidth and later be scaled to a higher bandwidth using the same infrastructure.

FIGS. 4–6 and 7–9 are simplified block diagrams of various embodiments of the transmit and receive end, respectively, of a DWDM system employing the wavelength bus architecture according to the principles of the invention. Because similar elements are included in each of these figures, only the differences will be described for sake of brevity. It should also be noted that the wavelength bus in these examples is assumed to include k wavelength channels, $\lambda_1$ to $\lambda_k$, which is a subset of the total number of wavelength channels N, $\lambda_1$ to $\lambda_N$, in the DWDM signal.

Figure 4:
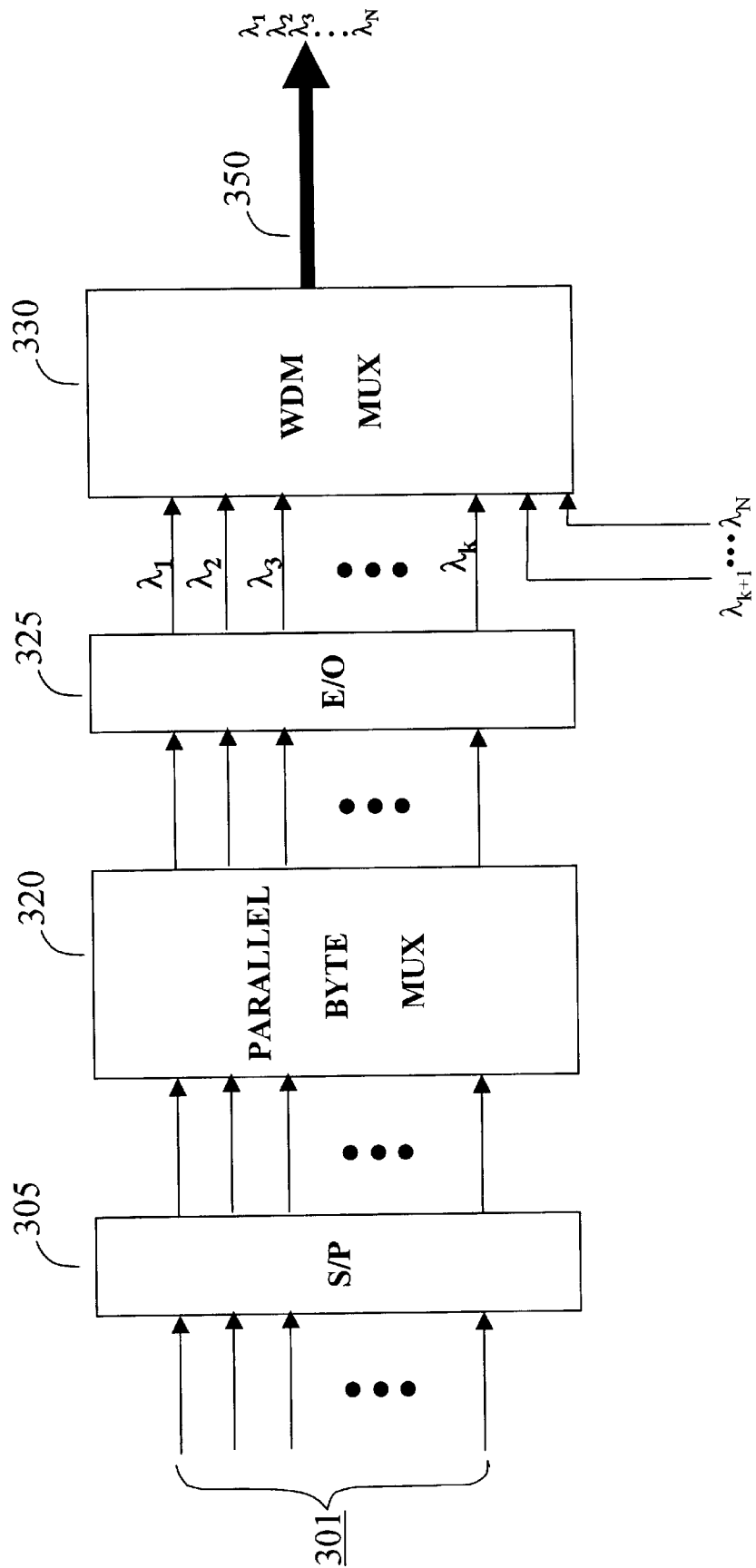
FIGS. 4–6 are simplified block diagrams of various embodiments of the transmit end of a transmission system employing the wavelength bus architecture according to the principles of the invention.

FIG. 4 shows one embodiment of the invention at the transmit end of a DWDM system in which multiple sources 301 supply information, e.g., data, in a serial format for transport over the DWDM system. As shown, the data provided by sources 301 is received by serial-to-parallel converter or converters 305 which convert the data into a parallel format using techniques well known in the art. The parallel formatted data is then supplied to a parallel byte multiplexer 320 which multiplexes the data supplied by one or more sources using parallel byte interleaving as previously described. In particular, parallel byte multiplexer 320 places the incoming data into a format, such as the format shown in FIG. 2, so that individual bits corresponding to the same byte are carried in parallel bit streams. The parallel bit streams are supplied from parallel byte multiplexer 320 to electrical-to-optical converters 325 which converts the bit streams from an electrical format to an optical format using well-known techniques. After conversion, each of the bit streams is associated with a single wavelength, shown here as wavelength channels $\lambda_1, \lambda_2 \ldots \lambda_k$, which together represent the wavelength bus. Using well-known DWDM techniques, optical multiplexer 330 combines wavelength channels $\lambda_1$ to $\lambda_k$ from the wavelength bus with other wavelength channels, e.g., $\lambda_{k+1}$ to $\lambda_N$, which may be wavelength channels from another wavelength bus or separate wavelength channels, for transmission as a composite DWDM signal along a single optical fiber 350.

Figure 5:
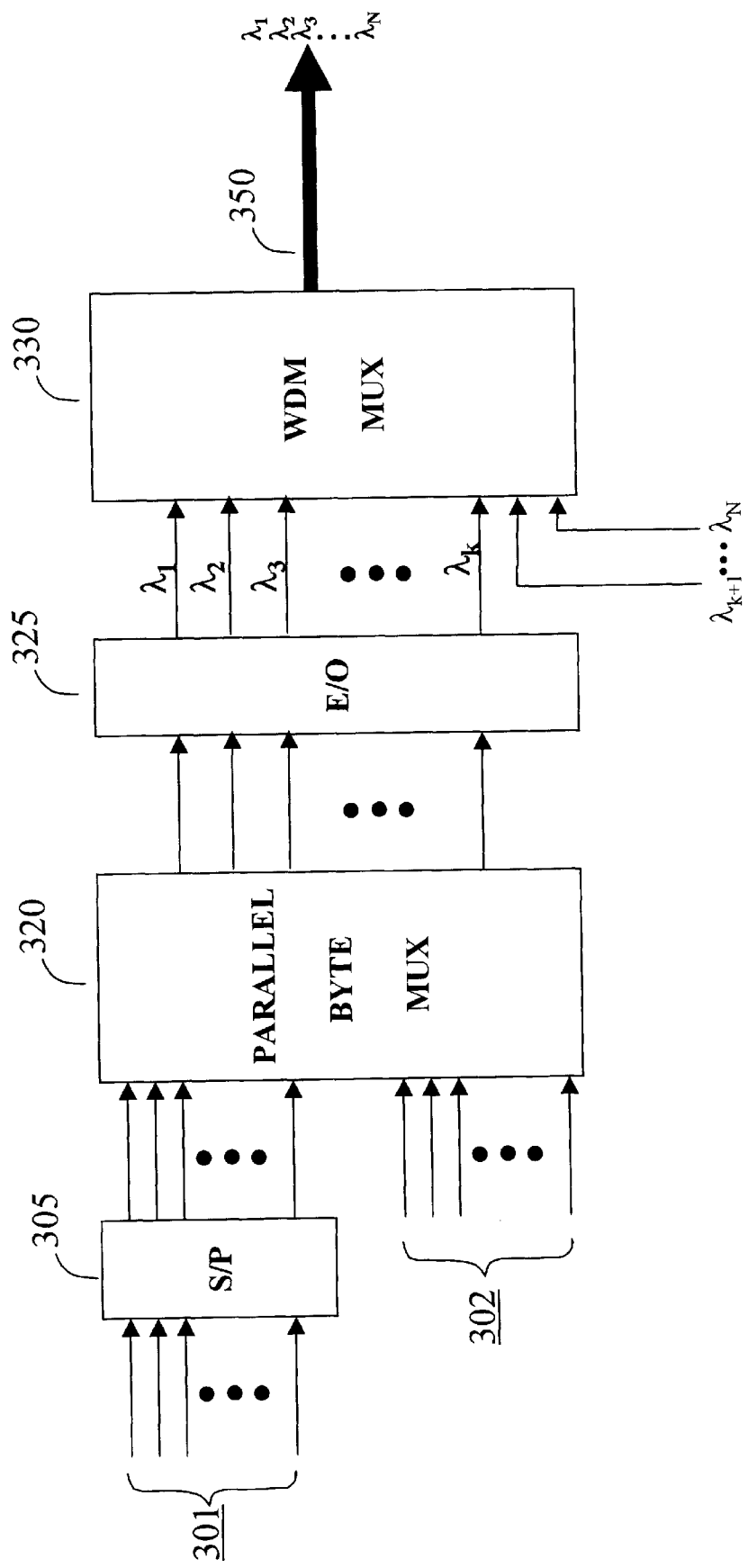

FIG. 5 is similar to FIG. 4 except that parallel byte multiplexer 320 receives information from a combination of serial sources 301 and parallel source 302. In this example, the serial data provided by sources 301 would be converted to a parallel format by serial-to-parallel converter 305 in the same way described above. The data supplied by parallel source 302 can be supplied directly to parallel byte multiplexer 320. The data supplied by each of serial sources 301 and parallel source 302 is then multiplexed using parallel byte interleaving as previously described.

Figure 6:
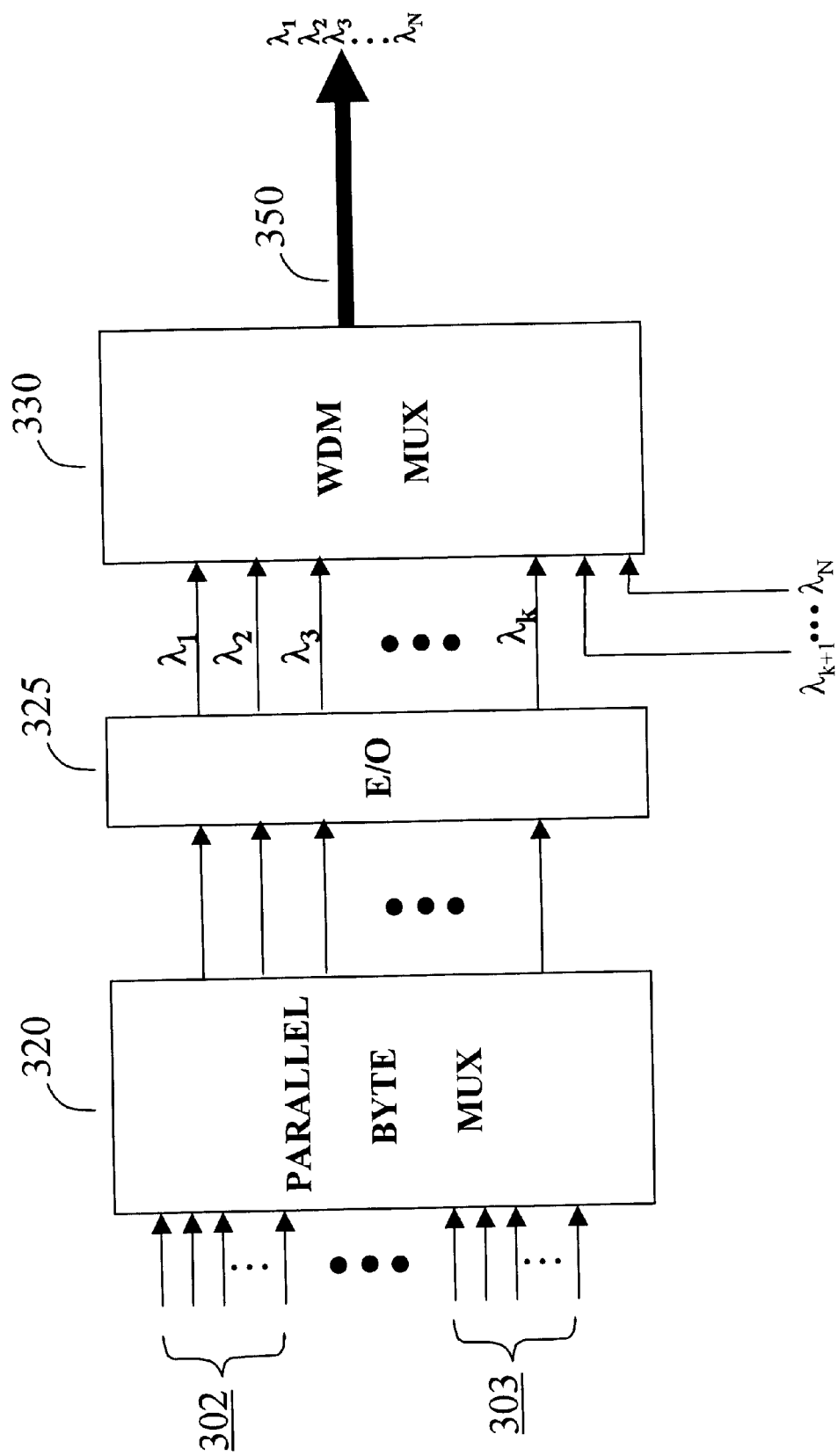

In the embodiment shown in FIG. 6, all data is supplied in a parallel format by parallel sources 302 and 303 directly to parallel byte multiplexer 320 without the need for any serial-to-parallel conversions. This last example illustrates the advantages of using parallel transmission in a wavelength bus architecture as a complement to communication systems and sources that supply information (e.g., data) that is already in a parallel format.

Figure 7:
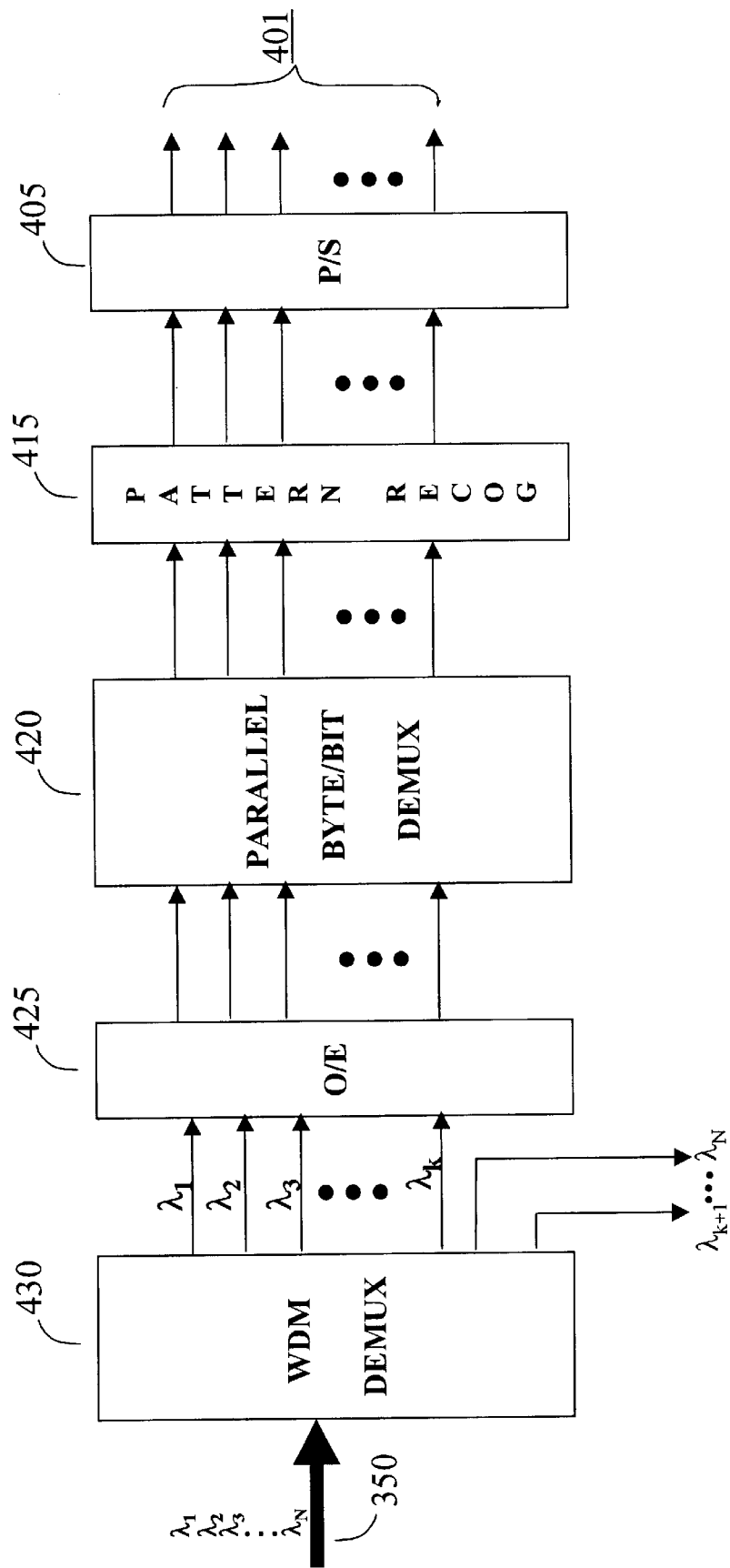
FIGS. 7–9 are simplified block diagrams of various embodiments of the receive end of a transmission system employing the wavelength bus architecture according to the principles of the invention.

FIG. 7 shows one exemplary embodiment of the invention at the receive end of a DWDM system. More specifically, the composite DWDM signal transported in optical fiber 350 comprises wavelength channels $\lambda_1$ to $\lambda_N$ which include therein a wavelength bus comprising wavelength channels $\lambda_1$ to $\lambda_k$. The composite DWDM signal is demultiplexed into its constituent wavelength signals using optical demultiplexer 430 according to well known techniques. Wavelength channels $\lambda_1$ to $\lambda_k$ in the wavelength bus are supplied to respective optical-to-electrical converters 425 which convert the bit streams from an optical format to an electrical format using well-known techniques. The other wavelength channels $\lambda_{k+1}$ to $\lambda_N$ are separately processed as appropriate. After conversion, each of the bit streams from the wavelength bus is supplied to a parallel byte/bit demultiplexer 420 where the data is disinterleaved and distributed into the appropriate bit streams, essentially performing the reverse operation of parallel byte multiplexer 320 from FIGS. 4–6. Each of the demultiplexed parallel bit streams is supplied by parallel byte/bit demultiplexer 420 to respective pattern recognition circuitry 415 for processing. In this example, the parallel bit streams are converted to serial bit streams by parallel-to-serial converter or converters 405 and supplied to receivers 401 as appropriate.

Figure 8:
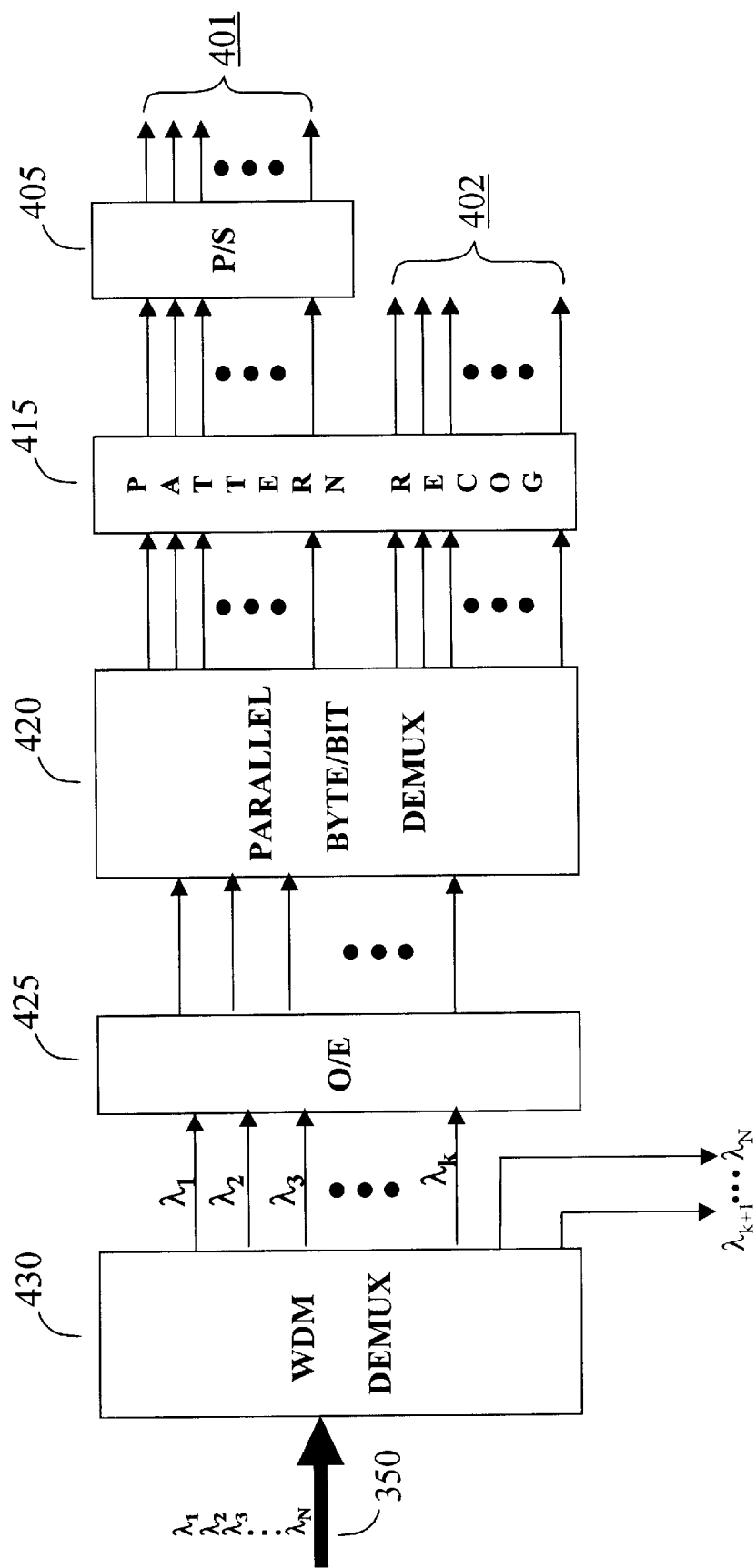

FIG. 8 is similar to the embodiment shown in FIG. 7 except that some of the parallel bit streams are converted to serial bit streams for receivers 401 but maintained in a parallel format for receivers 402.

Figure 9:
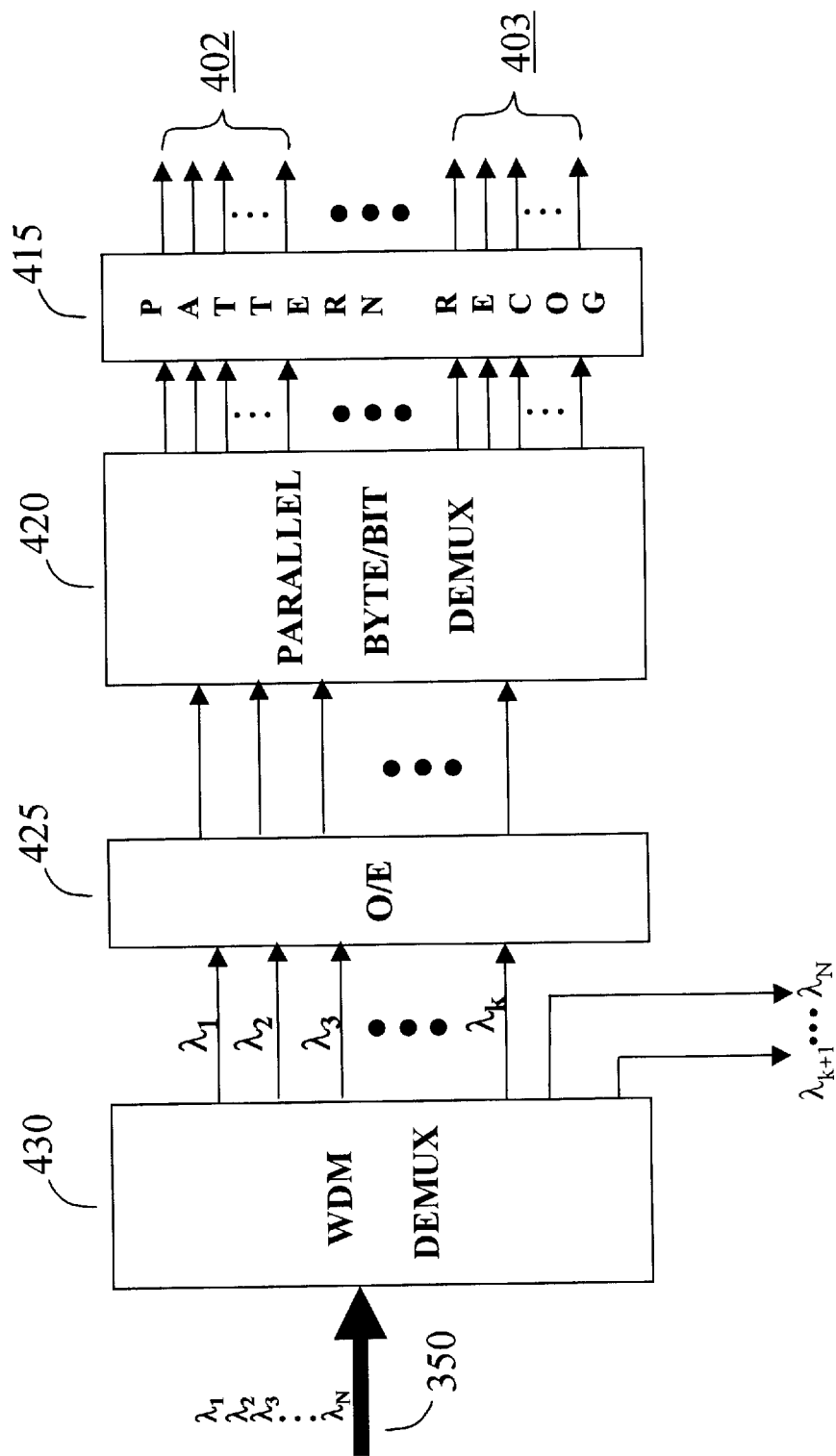

In the embodiment shown in FIG. 9, all data is supplied in a parallel format by parallel byte/bit demultiplexer 420 to pattern recognition circuitry 415 and receivers 402 and 403 without the need for any parallel-to-serial conversions. This last example again illustrates the advantages of using parallel transmission in a wavelength bus architecture as a complement to communication systems and sources that supply information (e.g., data) that is already in a parallel format.

FIGS. 4–9 illustrate another important advantage of using a wavelength bus architecture according to the principles of the invention. In particular, when a group of wavelength channels in the wavelength bus are used to transport information in parallel, with each wavelength channel operating at the same bit rate, the resources and overhead associated with the physical layer can be substantially reduced. More specifically, each of the individual wavelength channels within the wavelength bus will not require the same resources or overhead as in the prior art schemes in which the transport of information in each individual wavelength channel is separately managed. Accordingly, the resources associated with managing a wavelength bus can be scaled down as a function of the number of wavelength channels allocated for the wavelength bus, thereby reducing the cost and overall design complexity of the DWDM system.

As an example, the timing functions for a wavelength bus can be greatly simplified as compared to existing DWDM transport schemes. In a wavelength bus, a single phase locked loop (PLL) can be used for the timing functions associated with all of the wavelength channels within the wavelength bus. By contrast, prior schemes typically require a separate PLL and other associated timing circuitry for each individual bit stream carried in each wavelength channel.

Figure 10:
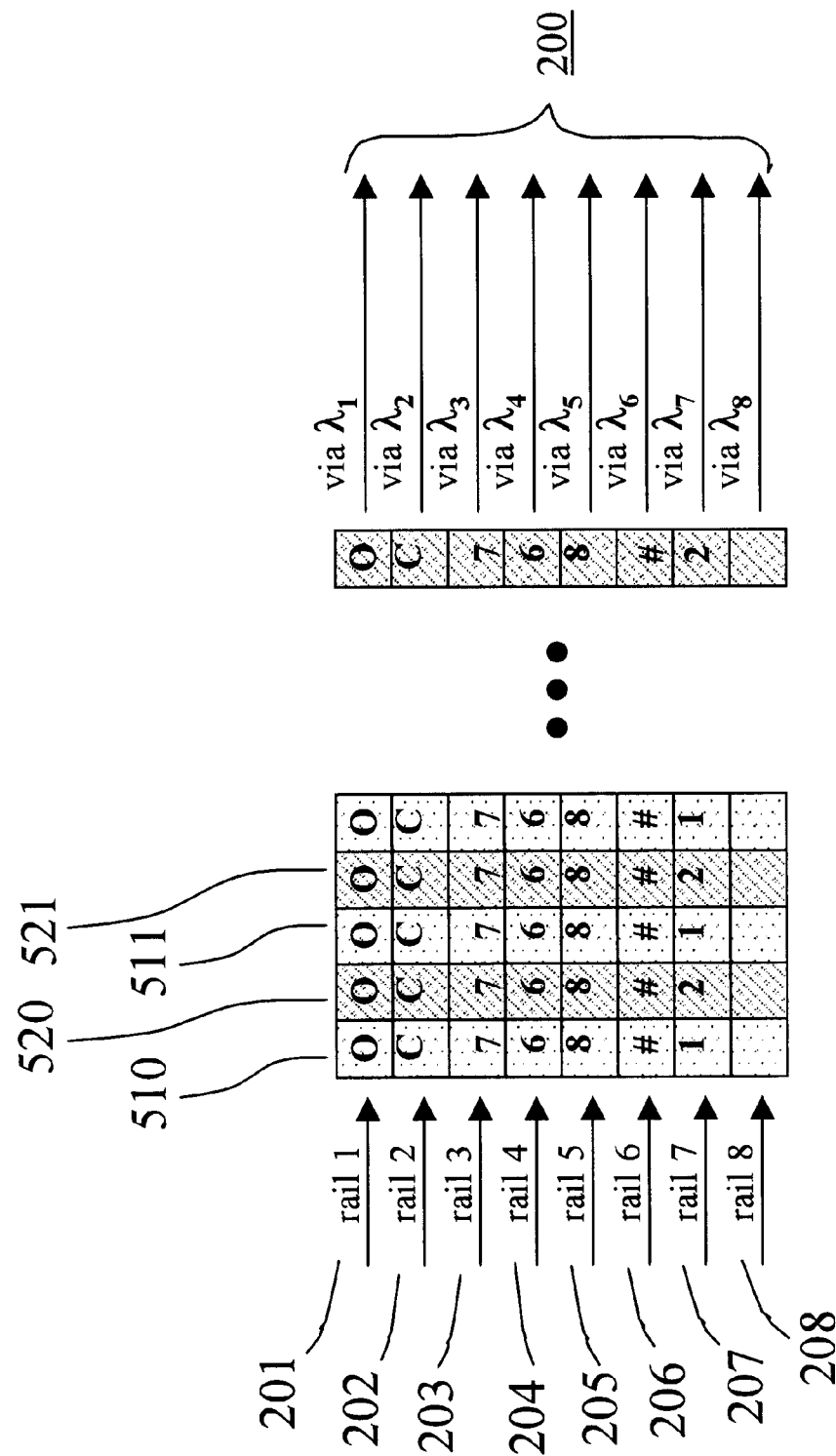
FIGS. 10–12 are simplified diagrams illustrating examples of how various signals can be byte interleaved for transport over a wavelength bus according to the principles of the invention.
Figure 11:
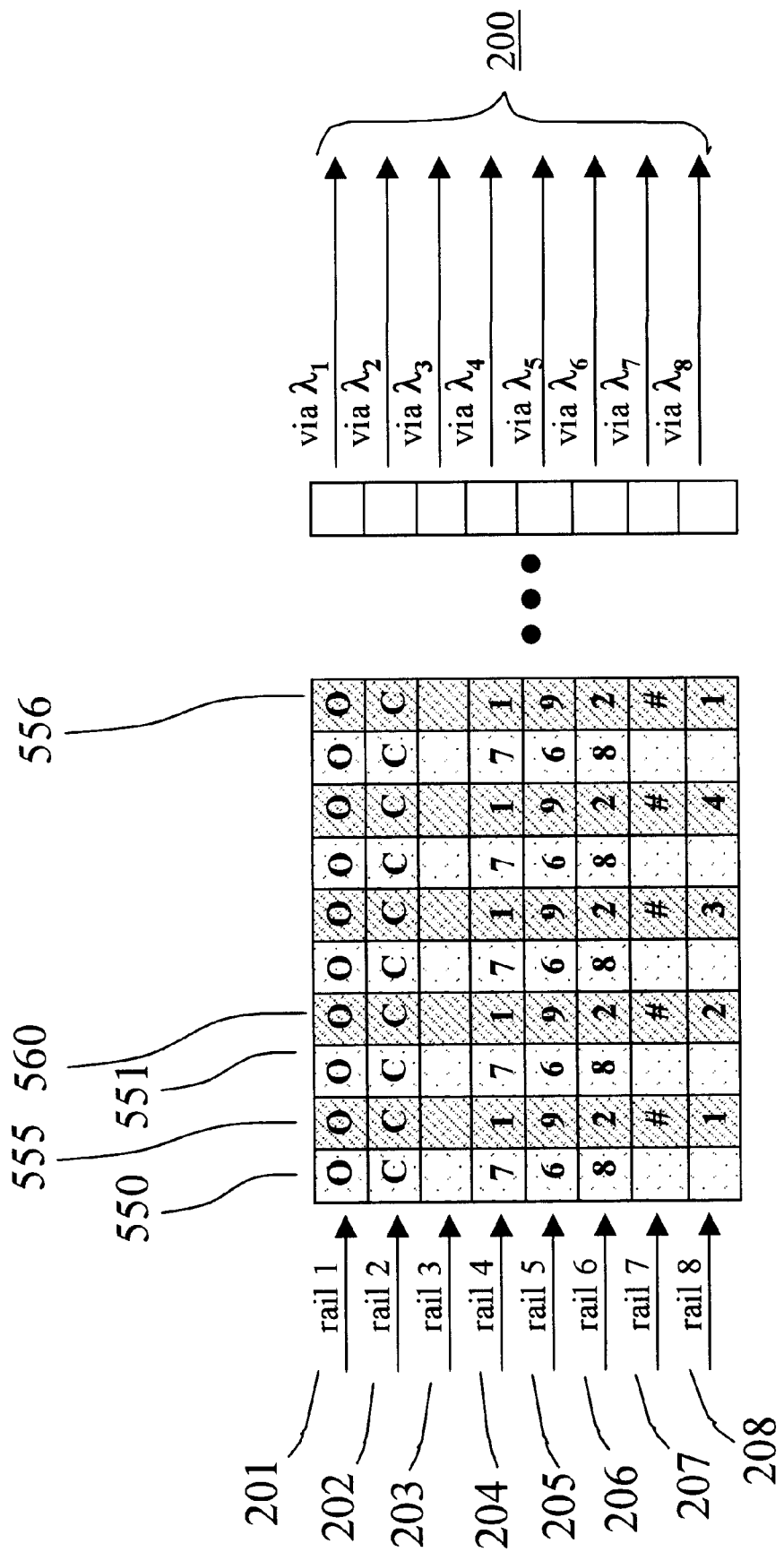
Figure 12:
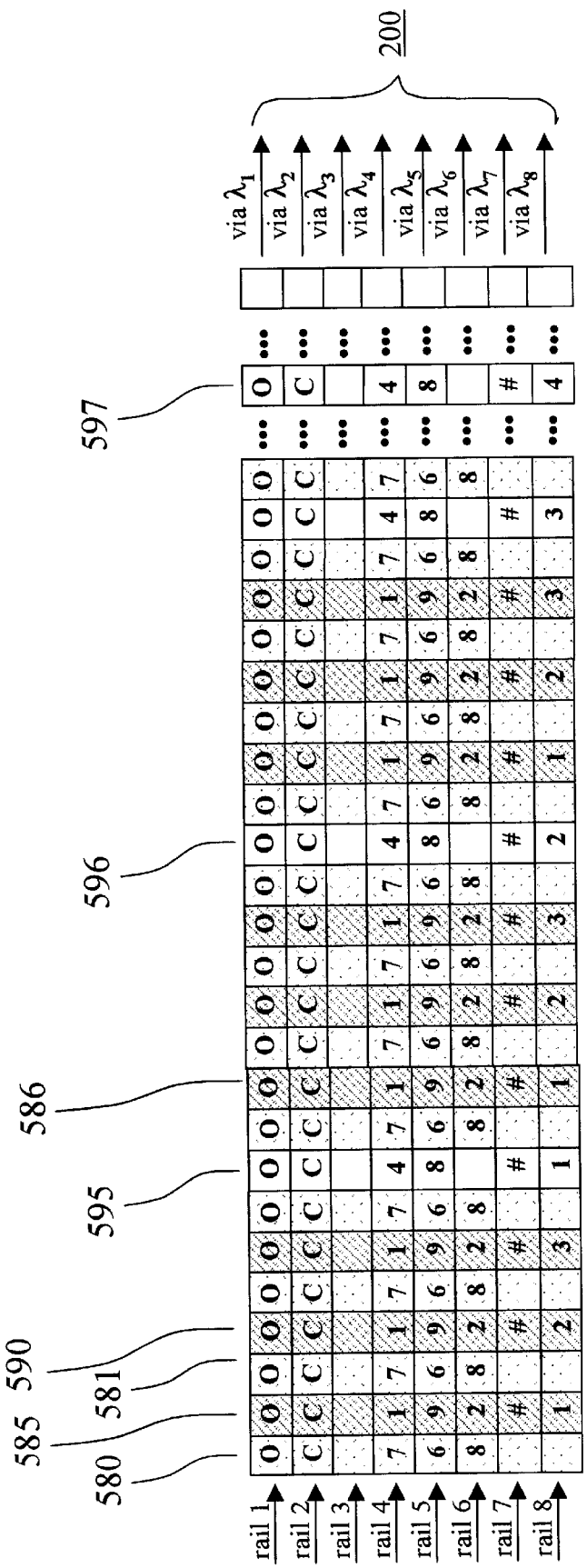

FIGS. 10–12 are simplified diagrams illustrating examples of how various signals can be byte interleaved for transport over a wavelength bus according to the principles of the invention. In each of the following examples, wavelength bus 200 includes 8 wavelength channels $\lambda_1$ to $\lambda_8$, with each operating at 10 Gbps to provide an aggregate bandwidth of 80 Gbps. It is also assumed that the data to be transported in wavelength bus 200 is formatted as 8-bit bytes so that each bit of a byte is supplied by a particular source to one of the eight (8) rails 201–208 shown in FIGS. 10–12. However, these examples are only meant to be illustrative and not limiting.

Referring to FIG. 10, there is shown one exemplary scheme in which wavelength bus 200 is used for transporting traffic generated by two SONET OC-768 (40 Gbps) traffic sources, OC-768 #1 and OC-768 #2. Because of the bit rate of an OC-768 source and given the aggregate bandwidth available in wavelength bus 200, bits from each OC-768 source will be repeated every other bit position in the transmitted bit stream in each rail 201–208. For example, bytes 510 and 511 represent bytes generated by OC-768 #1, which alternate in the bit streams with bytes 520 and 521 supplied by OC-768 #2. As such, each byte from a particular source will occupy 40 Gbs of the aggregate bandwidth. As those skilled in the art will realize, the repetition rate of the bytes from each of the OC-768 sources will depend on the bit rate of the source, available bandwidth, as well as synchronization and other pattern recognition considerations.

In FIG. 11, wavelength bus 200 is used for transporting traffic generated by one OC-768 (40 Gbps) traffic source, OC-768, and four OC-192 sources, OC-192 #1, #2, #3, #4. Because of the considerations described above concerning the byte repetition rate, bytes from the OC-768 source will be repeated every other bit position in the transmitted bit stream while bytes supplied by each OC-192 source are supplied every $8^{th}$ bit position in the bit stream, in this example. Again, these examples are merely illustrative and not meant to be limiting. As shown, bytes 550 and 551 are supplied by the OC-768 source, bytes 555 and 556 are generated by OC-192 #1 source, and byte 560 is supplied by OC-192 #2 source, and so on.

FIG. 12 is a similar example except that wavelength bus 200 is used for transporting traffic generated by one OC-768 (40 Gbps) traffic source, OC-768, three OC-192 sources, OC-192 #1, #2, #3, and four OC-48 sources, OC-48 #1, #2, #3, #4. The same considerations above apply equally here with regard to byte repetition rate. In particular, the higher rate OC-768 bytes will be repeated more frequently than the lower rate OC-192 bytes, which will be repeated more frequently than the even lower rate OC-48 bytes. As shown, bytes 580 and 581 are supplied by OC-768 source, bytes 585 and 586 are supplied by OC-192 #1, byte 590 is supplied by OC-192 #2, bytes 595, 596, and 597 are supplied by OC-48 #1, OC-48 #2, and OC-48 #4, respectively.

According to another aspect of the invention, framing and synchronization techniques are proposed for optimizing the high speed transport of data in a wavelength bus architecture. In one illustrative embodiment shown in FIG. 13, an additional wavelength channel 600 ($\lambda_m$) is added to the wavelength bus for the purpose of carrying a synchronizing pulse, p. This pulse p can be used to mark the beginning of a frame of information carried in the wavelength bus. In addition, wavelength channel 600 may also be used to carry signaling messages and other information since synchronizing pulse p does not occupy the entire channel. In another embodiment shown in FIG. 14, the beginning of a frame could be marked by a transition (e.g., from 0 to 1) using an additional wavelength channel 610 ($\lambda_m$) to signal the transition.

Figure 15:
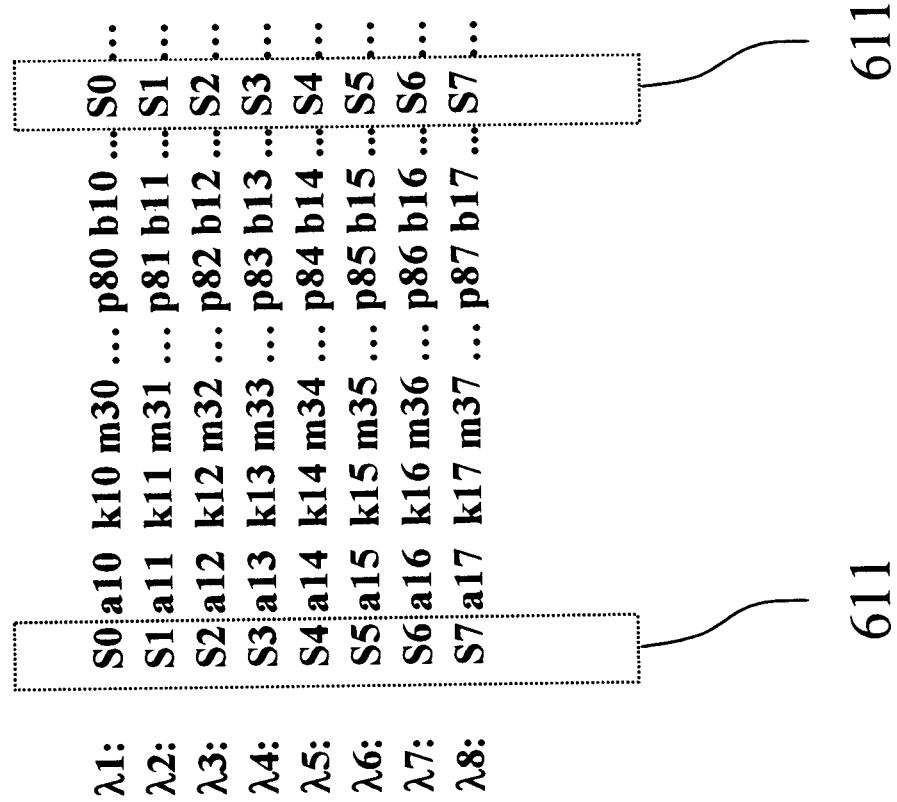

Synchronization can also be achieved by using a synchronizing byte as shown in FIG. 15, wherein a periodic synchronizing pattern 611, e.g., byte S (S0–S7), is multiplexed along with the information being carried in the existing wavelength channels of the wavelength bus. One advantage of this approach is that an additional wavelength channel is not required. However, this synchronization scheme may affect the bit rate in terms of maintaining the original bandwidth. For example, by adding the synchronizing pattern, the bandwidth would be increased by F/kB, where F is the original rate of the serial channel, B is the length of the byte, and k is a scaling factor, a number smaller than or equal to 1. For example, for F=10 Gbps, k=1 and B=8, a synchronizing pattern multiplexed every 8 parallel channels will increase the bit rate by 1.25 Gbps for a new overall bit rate of 11.250 Gbps. Clearly, as k becomes smaller, the increase in bit rate decreases. For example, if k=0.1 (i.e., synchronizing pattern inserted every 80 parallel channels), the new bit rate becomes 10.125 Gbps.

In another variation of the synchronizing byte approach, a separate synchronization pattern would not have to be added. Instead, a unique pattern (e.g., a framing pattern, byte, etc.) that may already exist as part of a header structure in the information being transmitted can be used as the synchronization pattern, e.g. existing overhead byte in a SONET/SDH frame, EP packet, or ATM cell. This scheme would not require an additional wavelength channel and would not affect the bandwidth used for transporting the information.

Figure 16:
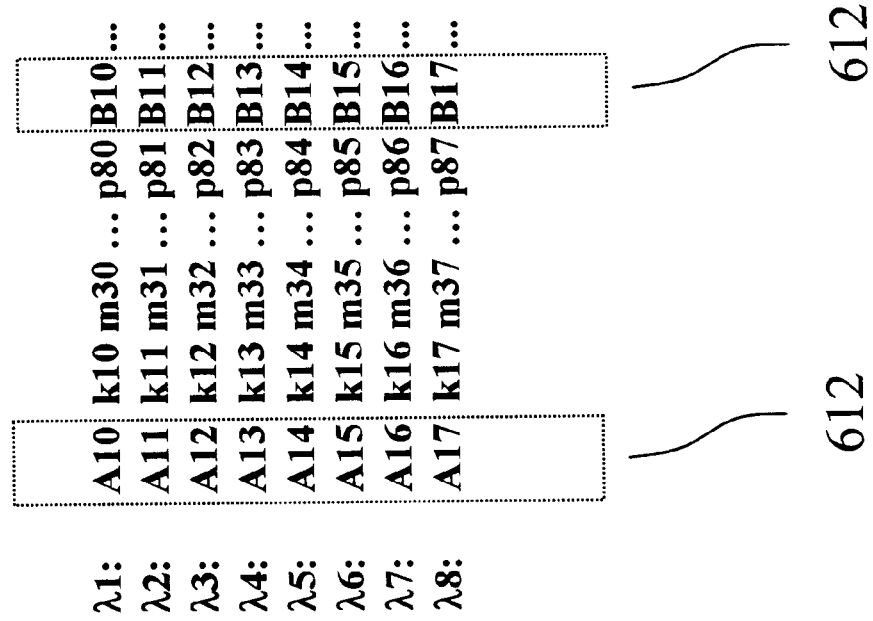

Synchronization can also be accomplished by energy density modulation as shown in FIG. 16. In one example, the optical energy density of a byte that marks the beginning of the frame can be modulated to about twice the average energy density of the remaining bytes being transported in the wavelength bus. The modulated byte is shown as byte 612. By way of example, fast energy modulators, which may be implemented with fast polarization techniques, can be used to provide this energy density modulation. It should be noted that the foregoing embodiments are only meant to be illustrative examples of different synchronization schemes that may be advantageously used in conjunction with the wavelength bus according to the principles of the invention. As such, other modifications that embody the principles of the invention may be apparent to those skilled in the art and are contemplated by the teachings herein.

Pattern recognition is another factor to be considered when transporting information in a wavelength bus according to the principles of the invention. In particular, because of the manner in which information is multiplexed and transported in a wavelength bus, the effective pattern recognition rate for any of the original traffic channels may be reduced. Using the format shown in FIG. 2 as an example, 8-bit bytes from a traffic source are repeated every eight parallel bytes. More specifically, byte 210 ($a_{10}$–$a_{17}$) from source 1 is transported in a parallel format using wavelength channels 251–258 ($\lambda_1$–$\lambda_8$) of wavelength bus 200. The next byte from source 1 is byte 211 ($b_{10-b17}$) and is transported using the same wavelength channels 251–258, but after the intervening bytes from the other sources are transmitted. Thus, the effective pattern recognition rate in this example would be divided by at least 8. Consequently, parallel transmission of information in a wavelength bus facilitates the use of less complex and less costly pattern recognition circuitry but which is capable of recognizing patterns in high bit rate transmissions. example of a pattern recognition technique that may be used is Associative RAM-Based Content Addressable Memory (AR-CAM) pattern recognition, which is described in detail in S. V. Kartalopoulos, "*Associative RAM-based CAM and its Application to Broadband Communication Systems*", IEEE Trans. Neural Networks, vol. 9, no. 5, Sept. 1998, pp. 1036–41, and which is incorporated by reference herein.

The foregoing is merely illustrative of the principles of the invention. Those skilled in the art will be able to devise numerous arrangements, which, although not explicitly shown or described herein, nevertheless embody principles that are within the spirit and scope of the invention. For example, although many of the embodiments shown and described herein were directed toward transporting SONET-based signals, the principles of the invention can be applied to any type of information that can be converted, if necessary, for transmission in a parallel format. In particular, the principles of the invention may be employed with either asynchronous systems which transmit cells and packets (e.g., ATM, IE, etc.) or with synchronous systems that transmit frames and the like (e.g., SONET, SDH, DS3, etc.). Moreover, the transport scheme described herein is equally applicable to digital communications systems, computer communications systems, and the like. Accordingly, the scope of the invention is limited only by the claims that follow.

I claim:

1. A method for transporting information in a wavelength division multiplexed (WDM) signal having a plurality of optical channels of different wavelengths, the method comprising the steps of:

allocating a selected number of the plurality of optical channels operating at the same transmission rate to constitute a transmission group;

receiving parallel-formatted information supplied by at least one source;

multiplexing the parallel-formatted information by interleaving bytes of information in a parallel format so that parallel-formatted information supplied by a first source is byte interleaved with parallel-formatted information supplied by at least a second source; and transmitting the multiplexed information in a parallel format in the transmission group within the WDM signal, wherein the information is formatted as bytes, each byte having N bits, the step of transmitting characterized by byte-wide parallel transmission wherein each optical channel in the transmission group carries a corresponding one of the N bits of a byte being transmitted.

2. The method of claim 1, wherein the step of interleaving bytes of information is performed as a function of the bit rate of the information supplied by the first and at least second sources.

3. The method of claim 2, wherein the bit rate of the first source and the bit rate of the at least second source are different from each other.

4. The method of claim 2, wherein the bit rate of the first source and the bit rate of the at least second source are equal.

5. The method of claim 1, wherein the step of interleaving bytes of information is performed according to a repetition rate for each of the first and at least second sources, the repetition rates being a function of the bit rate of the information supplied by the respective first and at least second sources.

6. A method for transporting information in a wavelength division multiplexed (WDM) signal having a plurality of optical channels of different wavelengths, the method comprising:

allocating a selected number of the plurality of optical channels operating at the same transmission rate to constitute a transmission group;

selectively allocating other ones of the plurality of optical channels to form at least a second transmission group;

receiving parallel-formatted information supplied by at least one source;

multiplexing the parallel-formatted information; and transmitting the multiplexed information in a parallel format in the transmission group within the WDM signal, wherein the information is formatted as bytes, each byte having N bits, the step of transmitting characterized by byte-wide parallel transmission wherein each optical channel in the transmission group carries a corresponding one of the N bits of a byte being transmitted, wherein the wavelength division multiplexed signal comprises a plurality of transmission groups each for carrying multiplexed parallel-formatted information therein.

7. The method of claim 6, wherein any of the plurality of transmission groups are capable of carrying information from a plurality of sources.

8. A method for transporting information in a wavelength division multiplexed (WDM) signal having a plurality of optical channels of different wavelengths, the method comprising the steps of:

allocating a selected number of the plurality of optical channels operating at the same transmission rate to constitute a transmission group;

receiving parallel-formatted information supplied by at least one source;

multiplexing the parallel-formatted information; and transmitting the multiplexed information in a parallel format in the transmission group within the WDM signal, wherein the information is formatted as bytes, each byte having N bits, the step of transmitting characterized by byte-wide parallel transmission wherein each optical channel in the transmission group carries a corresponding one of the N bits of a byte being transmitted, wherein the information supplied by the at least one source includes information formats selected from the group consisting of data traffic, Asynchronous Transfer Mode (ATM) traffic, Internet Protocol traffic, Synchronous Optical Network (SONET) traffic, and Synchronous Digital Hierarchy (SDH) traffic.

9. A method for transporting information in a wavelength division multiplexed (WDM) signal having a plurality of optical channels of different wavelengths, the method comprising the steps of:

allocating a selected number of the plurality of optical channels operating at the same transmission rate to constitute a transmission group;

receiving parallel-formatted information supplied by at least one source;

multiplexing the parallel-formatted information;

transmitting the multiplexed information in a parallel format in the transmission group within the WDM signal, one of the plurality of optical channels in the wavelength division multiplexed signal as a synchronization channel; and transmitting at least one of a synchronzation pulse in the synchronization channel to indicate a beginning frame of the information being transmitted in the transmission group, or a selected bit pattern in the synchronization channel, the selected bit pattern capable of indicating a transition corresponding to a beginning frame of the information being transmitted in the transmission group, wherein the information is formatted as bytes, each byte having N bits, the step of transmitting characterized by byte-wide parallel transmission wherein each optical channel in the transmission group carries a corresponding one of the N bits of a byte being transmitted.

10. The method of claim 9, further comprising the step of transmitting signaling information in the synchronization channel.

11. A method for transporting information in a wavelength division multiplexed (WDM) signal having a plurality of optical channels of different wavelengths, the method comprising:

allocating a selected number of the plurality of optical channels operating at the same transmission rate to constitute a transmission group;

receiving parallel-formatted information supplied by at least one source;

multiplexing the parallel-formatted information;

transmitting the multiplexed information in a parallel format in the transmission group within the WDM signal;

multiplexing a synchronization pattern with the parallel-formatted information being supplied by the at least one source; and transmitting the synchronization pattern in each of the optical channels in the transmission group, the synchronization pattern capable of indicating a beginning frame of the information being transmitted in the transmission group, wherein the information is formatted as bytes, each byte having N bits, the step of transmitting characterized by byte-wide parallel transmission wherein each optical channel in the transmission group carries a corresponding one of the N bits of a byte being transmitted.

12. A method for transporting information in a wavelength division multiplexed (WDM) signal having a plurality of optical channels of different wavelengths, the method comprising:

allocating a selected number of the plurality of optical channels operating at the same transmission rate to constitute a transmission group;

receiving parallel-formatted information supplied by at least one source;

multiplexing the parallel-formatted information;

transmitting the multiplexed information in a parallel format in the transmission group within the WDM signal; and modulating a selected byte of the information being transmitted in the transmission group, the modulated byte capable of indicating a beginning frame of the information being transmitted in the transmission group, wherein the information Is formatted as bytes, each byte having N bits, the step of transmitting characterized by byte-wide parallel transmission wherein each optical channel in the transmission group carries a corresponding one of the N bits of a byte being transmitted.

13. A system for transporting information in a wavelength division multiplexed (WDM) signal having a plurality of optical channels of different wavelengths, the system comprising:

a multiplexer capable of receiving parallel-formatted information supplied by at least one source and multiplexing the parallel-formatted information, the multiplexer being operable to interleaves bytes of information in a parallel format so that parallel-formatted information supplied by a first source is byte interleaved with parallel-formatted information supplied by at least a second source; and a plurality of optical transmitters for transmitting the multiplexed information in a parallel format and at the same transmission rate in a selected number of the plurality of optical channels comprising a transmission group within the WDM signal, wherein the information is formatted as bytes, each byte having N bits, the optical transmitter capable of byte-wide parallel transmission wherein each optical channel in the transmission group carries a corresponding one of the N bits of a byte being transmitted.

14. The system of claim 13, wherein the multiplexer interleaves bytes of information as a function of the bit rate of the information supplied by the first and at least second sources.

15. The system of claim 14, wherein the bit rate of the first source and the bit rate of the at least second source are different from each other.

16. The system of claim 14, wherein the bit rate of the first source and the bit rate of the at least second source are equal.

17. The system of claim 13, wherein the multiplexer interleaves bytes of information according to a repetition rate for each of the first and at least second sources, the repetition rates being a function of the bit rate of the information supplied by the respective first and at least second sources.

18. A system for transporting information in a wavelength division multiplexed (WDM) signal having a plurality of optical channels of different wavelengths, the system comprising:

a multiplexer capable of receiving parallel-formatted information supplied by at least one source and multiplexing the parallel-formatted information; and a plurality of optical transmitters for transmitting the multiplexed information in a parallel format and at the same transmission rate in a selected number of the plurality of optical channels comprising a transmission group within the WDM signal.

wherein the information is formatted as bytes, each byte having N bits, the optical transmitter capable of byte-wide parallel transmission wherein each optical channel in the transmission group carries a corresponding one of the N bits of a byte being transmitted, wherein the plurality of optical transmitters is are capable of transmitting the multiplexed information in a plurality of transmission groups within the wavelength division multiplexed signal.

19. A method for transporting information in a wavelength division multiplexed (WDM) signal having a plurality of optical channels of different wavelengths, the method comprising the steps of:

receiving parallel-formatted information supplied by at least one source;

multiplexing the parallel-formatted information by interleaving bytes of information in a parallel format so that parallel-formatted information supplied by a first source is byte interleaved with parallel-formatted Information supplied by at least a second source; and transmitting the multiplexed information In a parallel format in a transmission group within the WDM signal, the transmission group comprising a selected number of the plurality of optical channels operating at the same transmission rate, wherein the information is formatted as bytes, each byte having N bits, the step of transmitting characterized by byte-wide parallel transmission wherein each optical channel in the transmission group carries a corresponding one of the N bits of a byte being transmitted.

* * * * *